US008100389B2

(12) United States Patent
Tanaka et al.

(10) Patent No.: US 8,100,389 B2
(45) Date of Patent: Jan. 24, 2012

(54) PNEUMATIC ACTUATOR FOR VIBRATION DAMPING DEVICE AND VIBRATION DAMPING DEVICE USING THE SAME

(75) Inventors: Eiji Tanaka, Komaki (JP); Tetsuya Miyahara, Wako (JP)

(73) Assignees: Tokai Rubber Industries, Ltd., Komaki-shi (JP); Honda Motor Co., Ltd., Tokyo (JP)

( * ) Notice: Subject to any disclaimer, the term of this patent is extended or adjusted under 35 U.S.C. 154(b) by 828 days.

(21) Appl. No.: 12/213,841

(22) Filed: Jun. 25, 2008

(65) Prior Publication Data
US 2009/0008845 A1    Jan. 8, 2009

(30) Foreign Application Priority Data
Jul. 4, 2007    (JP) .................................. 2007-176812

(51) Int. Cl.
*F16F 5/00*    (2006.01)

(52) U.S. Cl. ............................ 267/140.15; 92/92; 92/96

(58) Field of Classification Search .................. 267/292, 267/136, 140.14, 140.15, 140.13; 92/90, 92/92, 96
See application file for complete search history.

(56) References Cited

U.S. PATENT DOCUMENTS

| 5,899,431 | A | * | 5/1999 | Lefol | ............................ 267/219 |
| 6,349,927 | B1 | | 2/2002 | Suzuki | |
| 6,585,242 | B2 | * | 7/2003 | Kodama et al. | .......... 267/140.13 |

FOREIGN PATENT DOCUMENTS

| GB | 2 414 533 A | 11/2005 |
| JP | A-2003-004090 | 1/2003 |
| JP | A-2003-130126 | 5/2003 |
| JP | A-2005-273685 | 10/2005 |

OTHER PUBLICATIONS

Sep. 6, 2011 Office Action issued in Japanese Patent Application No. 2007-176812 (with partial translation).

* cited by examiner

*Primary Examiner* — Robert Siconolfi
*Assistant Examiner* — Anna Momper
(74) *Attorney, Agent, or Firm* — Oliff & Berridge, PLC

(57) ABSTRACT

A pneumatic actuator for use in a vibration damping device comprising: a base housing; an elastic wall member being fastened fluid-tightly to the base housing to form a working air chamber therebetween; and an urging member positioned within the working air chamber for exerting urging force on an output portion provided to the elastic wall member, such that the output portion is actuated to undergo displacement in opposition to the urging member through change in an air pressure in the working air chamber from an outside. At least one of opposing faces of the base housing and the elastic wall member on the working air chamber side thereof has a plurality of rib portions which extend from an inner circumferential side thereof towards an outer circumferential side thereof. A vibration damping device equipped with the pneumatic actuator is also disclosed.

11 Claims, 9 Drawing Sheets

PNEUMATIC ACTUATOR FOR VIBRATION DAMPING DEVICE AND VIBRATION DAMPING DEVICE USING THE SAME

INCORPORATED BY REFERENCE

The disclosure of Japanese Patent Application No. 2007-176812 filed on Jul. 4, 2007 including the specification, drawings and abstract is incorporated herein by reference in its entirety.

BACKGROUND OF THE INVENTION

1. Field of the Invention

The present invention relates generally to a pneumatic actuator for use in a vibration damping device wherein displacement of the elastic wall member of a hermetically sealed working air chamber in association with changes in air pressure therein is converted into output, as well as to a fluid filled type vibration damping device employing the same. More specifically, the present invention is concerned with a pneumatic actuator of novel structure adapted to prevent noise associated with the elastic wall member striking against and moving away from the base housing, and a fluid filled type vibration damping device employing the same.

2. Description of the Related Art

Known pneumatic actuators are typically of designs whereby an output portion undergoes displacement through an externally-induced change in pressure within a working air chamber, and this displacement of the output portion is converted into output. For instance, such an actuator may be utilized as means for switching the vibration damping characteristics in a fluid filled type vibration damping device of pneumatic switching type whose vibration damping characteristics are switchable from the outside. In one design taught for example in JP2003-4090-A1, the pneumatic actuator includes: a base housing; an elastic wall member; a working air chamber hermetically sealed from the outside and formed between opposed faces of the housing and the elastic wall member; and an output portion disposed on the elastic wall member, which is urged in the direction away from the base housing by urging means provided to the working air chamber. Through negative pressure acting on the working air chamber from outside, the output portion will undergo displacement in the direction closer towards the base housing in opposition to the urging force of the urging means. Through atmospheric or positive pressure acting on the working air chamber from outside, the output portion will undergo displacement in the direction away from the base housing under the action of the urging force of the urging means.

In the pneumatic actuator of conventional structure disclosed in JP2003-4090-A1, portions of the opposing face of the base housing and the elastic wall member are parallel to each other, and when negative pressure acts on the working air chamber these opposing parallel faces will come into contact with each other, resulting in partial intimate contact between the base housing and the elastic wall member. Where these contacting faces are parallel faces which have been driven into intimate contact with each other in this way, there is a risk that noise will be produced in association with their release from the state of intimate contact when the pressure in the working air chamber changes from negative pressure to atmospheric pressure.

In particular, where the air pressure in the working air chamber is changed from the outside through a port which has been provided in the diametrical center section, when atmospheric pressure acts on the working air chamber through the port the base housing and the elastic wall member will be released from their state of contact under conditions such that a zone of negative pressure continues to be maintained towards the outer circumferential side from the location of intimate contact between the base housing and the elastic wall member within the working air chamber. Consequently, when the pressure in the working air chamber changes from negative pressure to atmospheric pressure, suctioning action similar to a suction disk will be produced towards the outer circumferential side from the location of contact between the base housing and the elastic wall, posing the risk of additional noise.

Furthermore, in the event that the air pressure acting on the working air chamber has changed from atmospheric pressure to negative pressure, if the elastic wall member is arranged to be brought into close contact with the base plate around its entire circumference, noise produced when the base plate and the elastic wall member strike each other will tend to become a problem.

SUMMARY OF THE INVENTION

It is therefore one object of this invention to provide a pneumatic actuator for use in a vibration damping device of novel structure capable of reducing or eliminating noise resulting when the elastic wall member switches between a state of contact with and a state of separation from the base housing in a simple manner without the need for special parts.

It is yet another object of the present invention to provide a fluid filled type vibration damping device of pneumatic switching type which employs the pneumatic actuator which pertains to the present invention, and which advantageously affords reduction or elimination of noise.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

One aspect of the present invention provides a pneumatic actuator for use in a vibration damping device including: a base housing; an elastic wall member being fastened fluidtightly to the base housing to form a working air chamber therebetween; and urging means or member positioned within the working air chamber for exerting urging force on an output portion provided to the elastic wall member, such that the output portion is actuated to undergo displacement in opposition to the urging means through change in an air pressure in the working air chamber from an outside, wherein at least one of opposing faces of the base housing and the elastic wall member on the working air chamber side thereof has a plurality of rib portions which extend from an inner circumferential side thereof towards the outer circumferential side thereof.

In the pneumatic actuator of structure according to the present invention, by forming a plurality of rib portions on at least one of the opposing faces of the base housing and the elastic wall member, it is possible to prevent the opposing faces of the base housing and the elastic wall member from being positioned in contact against one another in a state of intimate adhesion over their entire face. Consequently, it is possible to advantageously reduce or eliminate noise resulting from contact of the base housing and the elastic wall member, and noise resulting from their separation from a state of intimate adhesion.

In particular, with the base housing and the elastic wall member in a state of contact, the zone to the inner circumferential side and the zone to the outer circumferential side of the contact location of these components in the working air chamber will be maintained in a state of communication with one another through trough-shaped grooves or recessed portions which have been formed between the adjacent rib portions in the circumferential direction. Consequently, it is possible to prevent situations where, in the event that air pressure in the working air chamber has changed from negative pressure to atmospheric pressure, either the inner circumferential section or the outer circumferential section of the working air chamber forms a hermetic space which does not communicate with the atmosphere, thereby effectively avoiding appreciable noise caused by suctioning action similar to a suction disk.

In the pneumatic actuator for a vibration damping device pertaining to the present invention, the rib portions may be formed on the base housing.

Disposing the rib portions on the base housing in this way affords a high degree of freedom in terms of design of the elastic wall member. In particular it will be possible to advantageously avoid problems such as difficulty of the elastic wall member in deforming due to the rib portions having been formed on the elastic wall member. This arrangement makes it possible to effectively prevent noise from occurring during contact of the elastic wall member and the base housing, while at the same time meeting requirements as to output characteristics of the pneumatic actuator.

In the pneumatic actuator which pertains to the present invention, where the rib portions have been formed on the base housing side, an annular projecting portion which extends continuously in a circumferential direction is formed at inner circumferential ends of the rib portions, while a communicating groove which extends in a diametrical direction is formed on at least one of contact faces of the elastic wall member and the annular projecting portion.

By providing an annular projecting portion at the inner circumferential ends of the rib portions in this way, the rib portions will be connected to one another so that the shape of the rib portions can be stabilized. A state of contact between the base housing and the elastic wall member about the entire circumference can be advantageously realized, thus effectively providing a stopper action which will limit deformation of the elastic wall member. Furthermore, by forming a communicating groove which extends in the diametrical direction on at least one of the contact faces of the elastic wall member and the annular projection, zones to the inner circumferential side and the outer circumferential side of the contact location of these components in the working air chamber will be maintained in a state of communication with one another through the communicating groove, even where the elastic wall member and the base housing have been forced into contact around the entire circumference at the location of the annular projection. It will be possible thereby to advantageously prevent noise from occurring when the base housing and the elastic wall member are released from contact.

In the pneumatic actuator which pertains to the present invention, outer circumferential ends of the rib portions are formed of length that does not reach as far as outer circumferential edges of the base housing and the elastic wall member.

With this arrangement, rib portions are provided in the center section, which experiences a relatively large level of displacement when actuated, but not provided in the outer circumferential section, which experiences a relatively small level of displacement when actuated. Therefore, the increase in mass associated with forming the rib portions can be minimized and the effect of the present invention in terms of reducing or eliminating noise produced by the base housing and elastic wall member coming into contact or separating can be effectively achieved.

In the pneumatic actuator which pertains to the present invention, where the rib portions have been formed extending as far as the diametric medial section, the projecting distal end faces of the outer circumferential ends of the rib portions may be defined as sloping faces which gradually decrease in height towards the outer circumferential side.

By providing such sloping faces, contact between the base housing and the elastic wall member may be cushioned to a greater extent, and striking noise during contact may be reduced or eliminated more advantageously. Moreover, by defining the inner circumferential end faces of the grooves formed between neighboring rib portions as sloping faces, shock caused by striking of the base housing and the elastic wall member may be minimized to a greater extent and striking noise may be effectively prevented.

In the present invention, there can also be employed a structure wherein lightening slots are formed on the back face situated on the side opposite from the working air chamber, at locations corresponding to those where the rib portions have been provided.

By forming lightening slots in this way, it will be possible to prevent the base housing from having increased weight due to the rib portions so that a pneumatic actuator having the structure according to the present invention can be realized with lighter weight. Moreover, by forming the rib portions so that they extend towards the outer circumferential side as far as the diametric medial section, while forming the lightening slots so as to extend as far as the diametric medial section on the back face which is the side opposite the direction in which the rib portions project, the rigidity of the base housing can be advantageously assured while at the same time lowering the weight of the base housing.

Furthermore, in the invention relating to a pneumatic actuator, bracing projections which are lower in height than the rib portions may be formed between neighboring rib portions in the circumferential direction.

By providing such bracing projections which are lower in height than the rib portions, when the base housing and the elastic wall member come into contact the elastic wall member will come into contact in stepwise manner with the rib portions and then with the bracing projections, thereby diffusing shock at the time of contact. Consequently, it will be possible to more advantageously reduce or avoid noise occurring when the base housing and the elastic wall member come into contact.

Furthermore, in the pneumatic actuator pertaining to the present invention provided with bracing projections, in preferred practice lightening slots will be formed on the back face situated on the side opposite from the working air chamber at locations corresponding to locations where the bracing projections have been provided.

By forming lightening slots at locations where the bracing projections have been provided, it will be possible to prevent the base housing from being increased in mass by the bracing projections. Thus, a pneumatic actuator capable of advantageously suppressing striking noise can be achieved with reduced weight.

In the pneumatic actuator which pertains to the present invention, there may be employed a structure in which elastic projections project towards the base housing-contacting face of the elastic wall member.

By forming elastic projections which project from specific regions of the elastic wall member, contact between the elastic wall member and the base housing may take place in a more cushioned manner and the problem of striking noise can be effectively eliminated.

The present invention further provides a fluid filled type vibration damping device including: a first mounting member; a second mounting member of tubular shape such that the first mounting member is positioned with a distance on a side of a first opening of the second mounting member; a main rubber elastic body by which the first mounting member and the second mounting member are linked together such that the first opening of the second mounting member being blocked off by the main rubber elastic body; a flexible film by which another opening of the second mounting member is blocked off, thereby forming between the main rubber elastic body and the flexible film a fluid chamber filled with a non-compressible fluid; a partition member arranged in the fluid chamber and fixedly supported by the second mounting member thereby forming to either side of the partition member a pressure receiving chamber a portion of whose wall is defined by the main rubber elastic body and which is affected by internal pressure fluctuations, and an equilibrium chamber a portion of whose wall is defined by the flexible film and which readily permits changes in volume; a first orifice passage which connects the pressure receiving chamber and the equilibrium chamber; a second orifice passage which is tuned to a higher frequency band than the first orifice passage, the first and second orifice passages being formed in the partition member; and a pneumatic actuator according to any one of the above mentioned preferred forms of the present invention being provided on opposite side of the flexible film from the equilibrium chamber, wherein output associated with actuated displacement of the output portion acts on the flexible film causing the flexible film to undergo displacement with respect to an opening of the second orifice passage, thereby switching the second orifice passage between a communicating state and an obstructed state.

In an actuator for the purpose of switching the vibration damping characteristics of a fluid filled type vibration damping device as described above, by employing a pneumatic actuator of structure according to the present invention, noise can be prevented from occurring at times of actuation by the actuator, and a high level of quiet inside the passenger cabin may be achieved.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
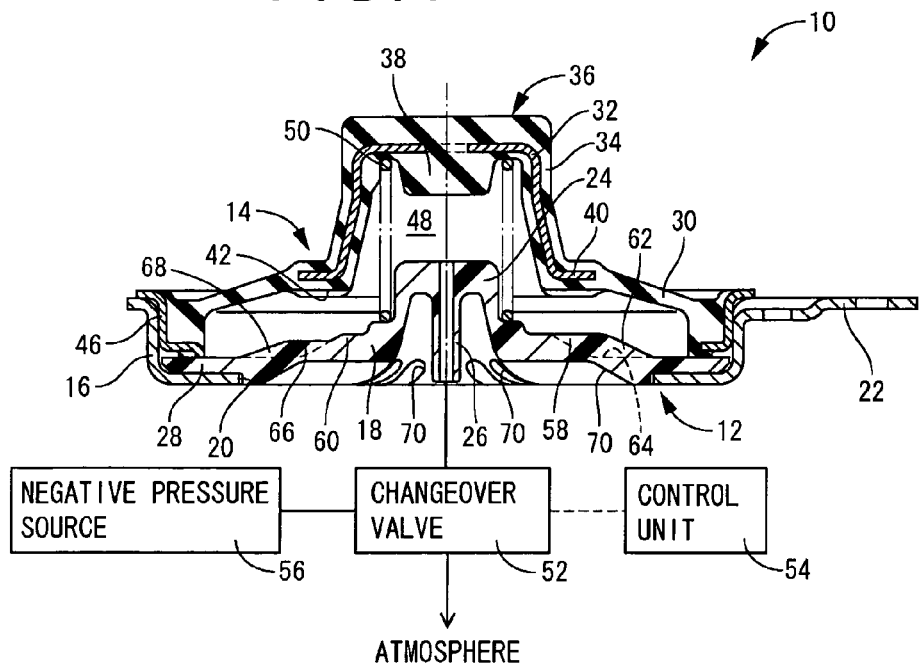
FIG. 1 is an elevational view in vertical cross section of a pneumatic actuator for vibration damping in the form of a negative pressure type actuator according to one preferred form of the invention, taken along line 1-1 of FIG. 2.
Figure 2:
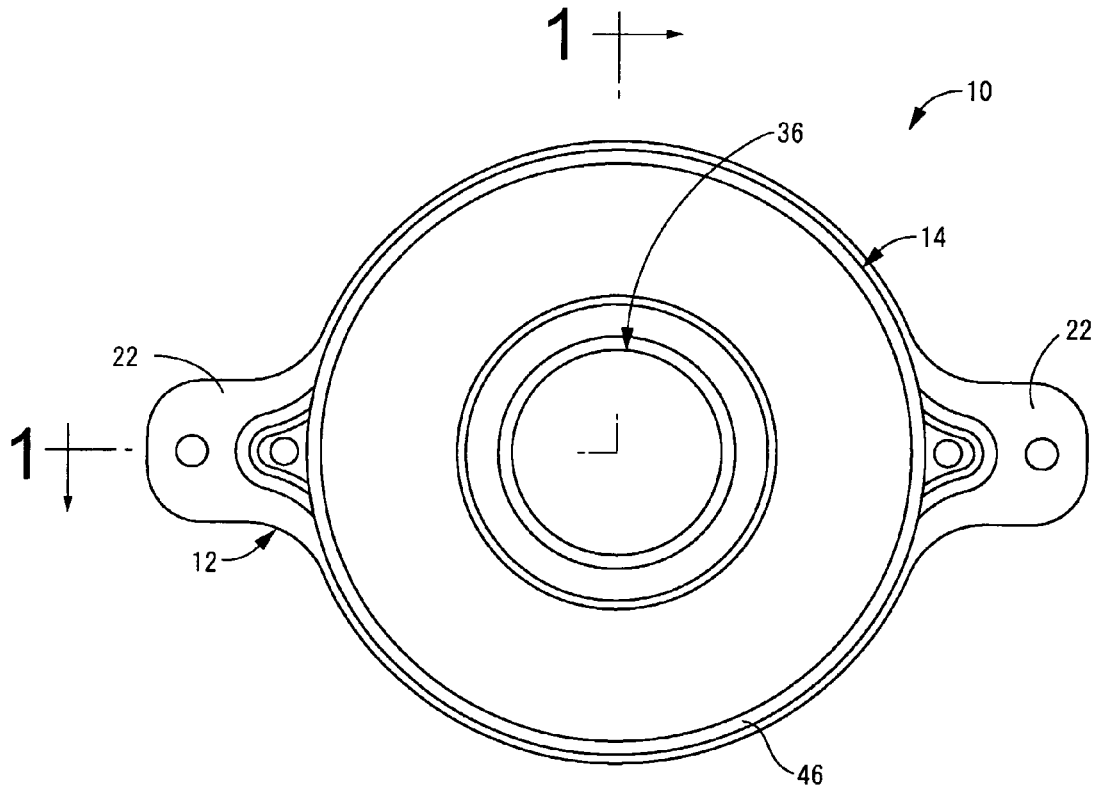
FIG. 2 is a top plane view of the negative pressure type actuator of FIG. 1.
Figure 3:
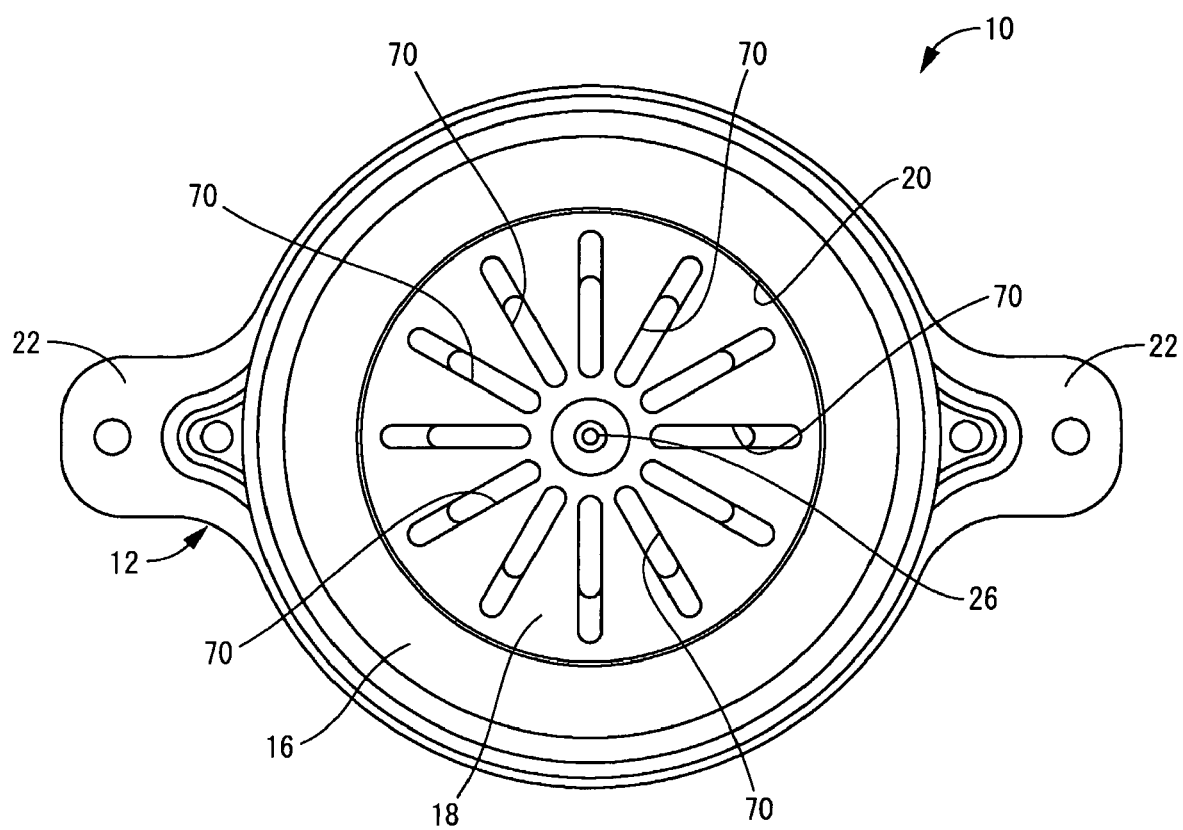
FIG. 3 is a bottom plane view of the negative pressure type actuator of FIG. 1.

FIGS. 1, 2, and 3 depict a negative pressure type actuator 10 by way of one embodiment of a pneumatic actuator for a vibration damping device, which is of structure according to the present invention. This negative pressure type actuator 10 includes a base member 12 as the base housing, and an elastic dividing wall 14 as the elastic wall member. In the following description, vertical direction shall as a general rule refer to the vertical direction in FIG. 1, which is also the plumb vertical direction in the present embodiment.

In more detail, the base member 12 further includes a base fitting 16 and a base plate member 18. The base fitting 16 is fabricated from metal material such as iron or aluminum alloy, and has shallow-bottomed, generally dish-shaped contours provided in the diametrical center section with a large-diameter circular hole 20 which passes through the base fitting 16 in the axial direction. At opposed locations along an axis lying in the diametrical direction at the edge of the opening of the base fitting 16 there are formed a pair of mounting pieces 22, 22 which extend towards the outer circumferential side; and a through-hole for a fastening member such as a bolt or rivet is formed in each of the pair of mounting pieces 22, 22.

As shown in FIGS. 4 through 8 the base plate member 18 has a generally circular disk shape, and in the present embodiment is fabricated of hard synthetic resin material. A center projecting portion 24 of generally inverted cup shape is formed in the diametrical center section of the base plate member 18. In the center projecting portion 24a conduit is formed so as to pass through the diametrical center section; and a port 26 which extends towards the outside (axially downward) through the diametrical center section is integrally formed as well. The specific structure of the center projecting portion 24 shown here is merely exemplary and should not be construed as limiting in any way. It would be acceptable for the port 26 to be attached later as a separate component, for example. At the outer circumferential edge of the base plate member 18, there is integrally disposed contact support portion 28 of annular plate shape which is thinner than the inner circumferential section. The base plate member 18 is assembled with the base fitting 16 with the center section of the former fitting into the circular hole 20 of the base fitting 16, and with the contact support portion 28 at its outer circumferential edge juxtaposed against the bottom wall of the base fitting 16. The base fitting 16 and the base plate member 18 together constitute the base member 12.

Meanwhile, the elastic dividing wall 14 includes an elastic leg portion 30 formed by a rubber elastic body; a pressure fitting 32 which is vulcanization bonded to the elastic leg portion 30; and a sheath rubber 34 which covers the surface of the pressure fitting 32. The elastic leg portion 30 has a generally circular disk shape, and its inner circumferential edge is vulcanization bonded to the pressure fitting 32. This pressure fitting 32 is a thin fitting having generally inverted cup shape, and is fabricated for example by press-forming of sheet metal. The surface of the pressure fitting 32 is covered entirely by the sheath rubber 34 which has been integrally formed with the elastic leg portion 30; in the present embodiment, the pressure fitting 32 covered by the sheath rubber 34 constitutes an output portion 36. In this embodiment, the sheath rubber 34 which covers the upper base wall of the pressure fitting 32 is relatively thick and is designed to come into cushioned contact with another member such as a diaphragm 110, discussed later.

On the sheath rubber 34 which covers the bottom face of the upper base plate portion of the pressure fitting 32 there is integrally formed a stopper rubber 38 which has circular block shape and which projects downward. Through contact between this stopper rubber 38 and the center projecting portion 24, there is produced a stopper mechanism which limits relative displacement of the base member 12 and the elastic dividing wall 14 in the proximal direction.

Furthermore, a fastening flange 40 of flange shape is formed about the entire circumference at the outer circumferential edge of the pressure fitting 32, and the sheath rubber 34 (contact rubber layer) affixed to the bottom face of this fastening flange 40 is relatively thick. On the bottom face side of the fastening flange 40, there are formed in the sheath rubber 34 communicating grooves 42 which extend in the diametrical direction and opens downward and to either diametrical side. These communicating grooves 42 are formed so as to span across in the diametrical direction the sheath rubber 34 which has been vulcanization bonded to the bottom face of the fastening flange 40. The openings at either diametrical side of the communicating grooves 42 are positioned to either side of the location of contact of the elastic dividing wall 14 with the base plate member 18.

Figure 9:
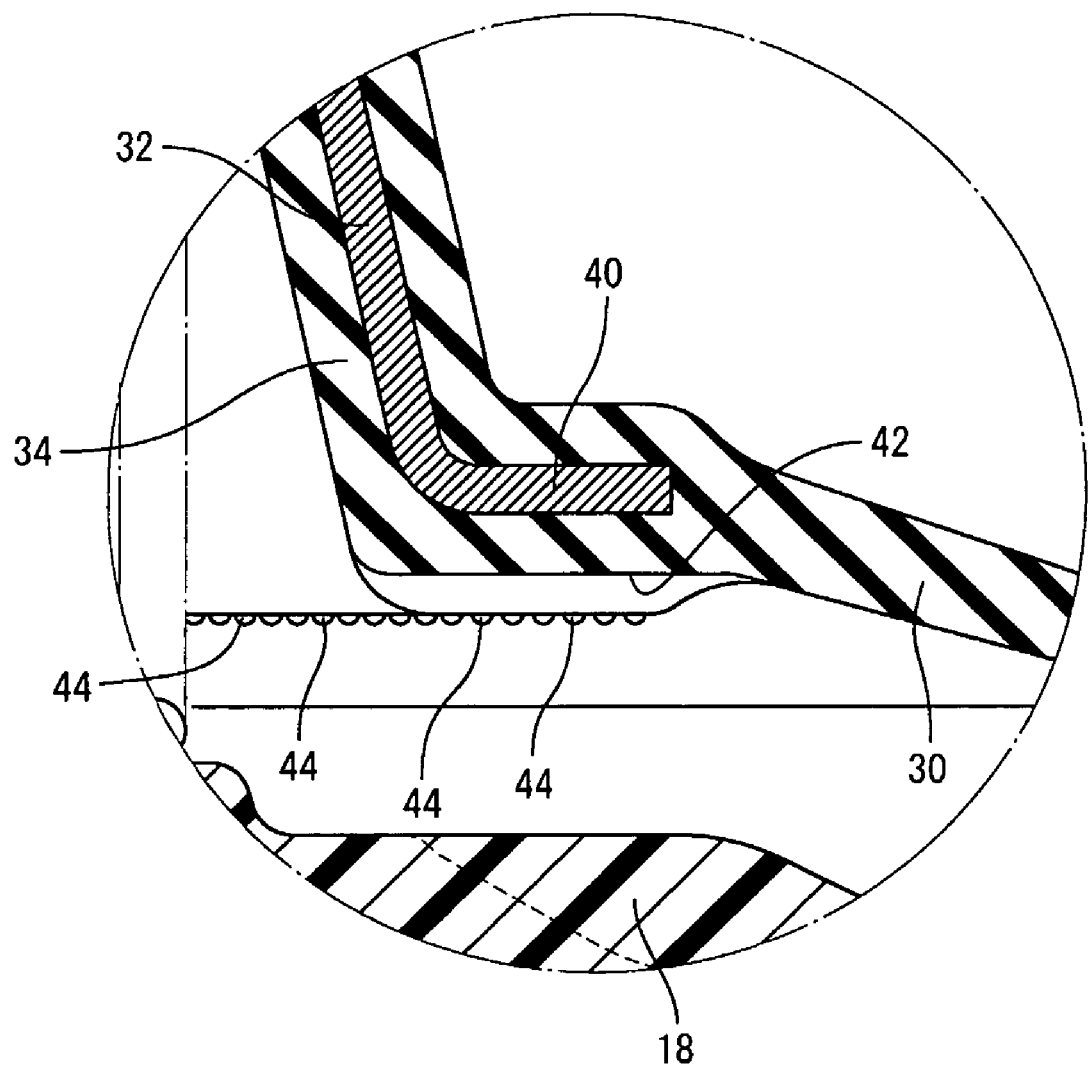
FIG. 9 is a fragmentally enlarged cross sectional view of the negative pressure type actuator of FIG. 1.

As shown in enlarged view in FIG. 9, the thick sheath rubber 34 which has been affixed to the bottom face of the fastening flange 40 has formed on it a multitude of minute projections 44 which define elastic projections that project downward. These minute projections 44 are formed in the thick section of the sheath rubber 34 including the portion thereof which is anticipated to come into contact against the base plate member 18, and cover either the entire face or portions thereof. The minute projections 44 may be formed as independent projections of semispherical shape or in various other patterns such as a grained pattern, or an uninterrupted or interrupted ridged pattern. While the height of the minute projections 44 is not limited in any way, height of between about 0.1 mm and 3.0 mm is preferable.

A sleeve fitting of generally annular shape is defined by a sleeve ring 46 which is vulcanization bonded to the outer circumferential edge of the elastic dividing wall 14. The sleeve ring 46 is an annular fitting which extends in the circumferential direction and has a generally "L" shaped cross section which has been provided with a peripheral wall portion and a bottom wall portion; the outer circumferential face of the elastic dividing wall 14 is vulcanization bonded to its inner circumferential face.

By press fitting and fastening the sleeve ring 46 onto the peripheral wall portion of the base fitting 16, the elastic dividing wall 14 will be attached securely to the base member 12, and the output portion 36 which has been provided to the pressure fitting 32 will be positioned above the base plate member 18 in the center section of the base member 12. With the elastic dividing wall 14 attached to the base fitting 16, the outer circumferential edge portion of the elastic dividing wall 14 will be in fluidtight contact against the contact support portion 28 which has been disposed on the outer circumferential edge portion of the base plate member 18, thereby forming between the opposed faces of the base plate member 18 and the pressure fitting 32a working air chamber 48 which is isolated from the outside space.

In the center portion of working air chamber 48, there is housed a coil spring 50 which constitutes the urging means or member, and is positioned between the opposed faces of the base plate member 18 and the pressure fitting 32 (the output portion 36). This coil spring 50 is supported positioned in the diametrical direction, fitting onto the center projecting portion 24. Through the urging force of the coil spring 50, the output portion 36 will normally be urged axially upward away from the base member 12. Thus, when the air pressure in the working air chamber 48 is atmospheric pressure or positive pressure, the output portion 36 of the elastic dividing wall 14 will be positioned some distance above the base plate member 18 in the center section of the base member 12.

As shown in FIG. 1, in this negative pressure type actuator 10 the port 26 is connected via a conduit to a changeover valve 52 such as a three-way valve. The changeover valve 52 is switched by a control unit 54 thereby selectively connecting the working air chamber 48 through the port 26 to either the outside atmosphere or a negative pressure source 56. When the working air chamber 48 is exposed to the action of the atmosphere from the outside, the output portion 36 of the elastic dividing wall 14 will undergo displacement axially upward under the urging force of the coil spring 50. When the working air chamber 48 is exposed to the action of negative pressure from the outside, the output portion 36 of the elastic dividing wall 14 will be suctioned towards the base member 12 (axially downward) in opposition to the urging force of the coil spring 50. In the negative pressure type actuator 10, the elastic dividing wall 14 will thereby be actuated up or down in the axial direction to provide output in the axial direction. As the negative pressure source 56, it would be possible to utilize, for example, the negative pressure created by the intake system of the internal combustion engine (engine) of the automobile.

Figure 10:
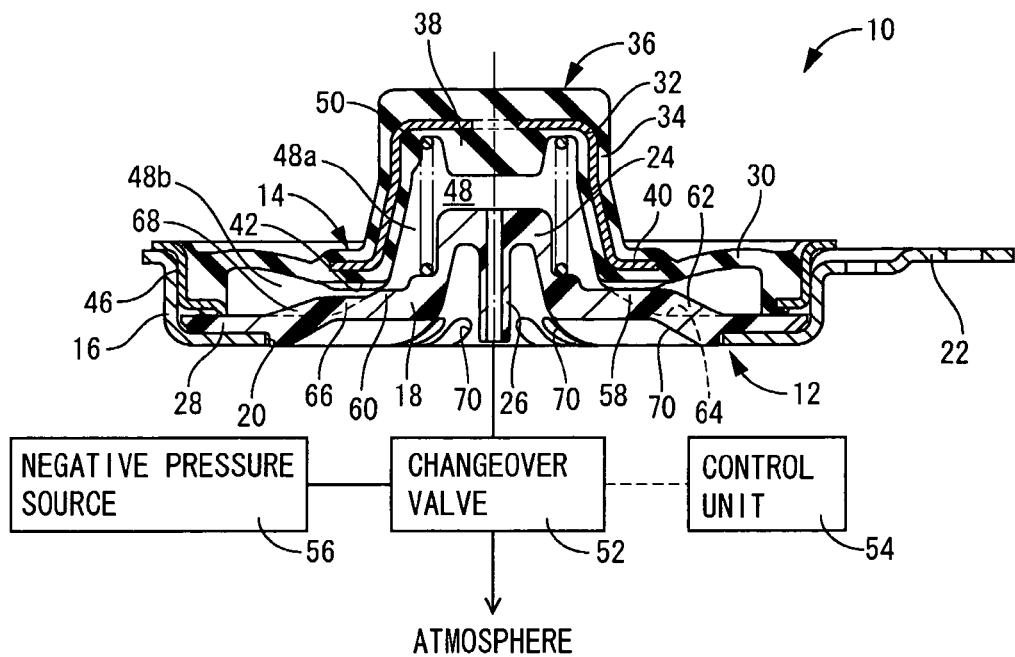
FIG. 10 is a cross sectional view of the negative pressure type actuator in the state where a given negative pressure is applied to a working air chamber.
Figure 11:
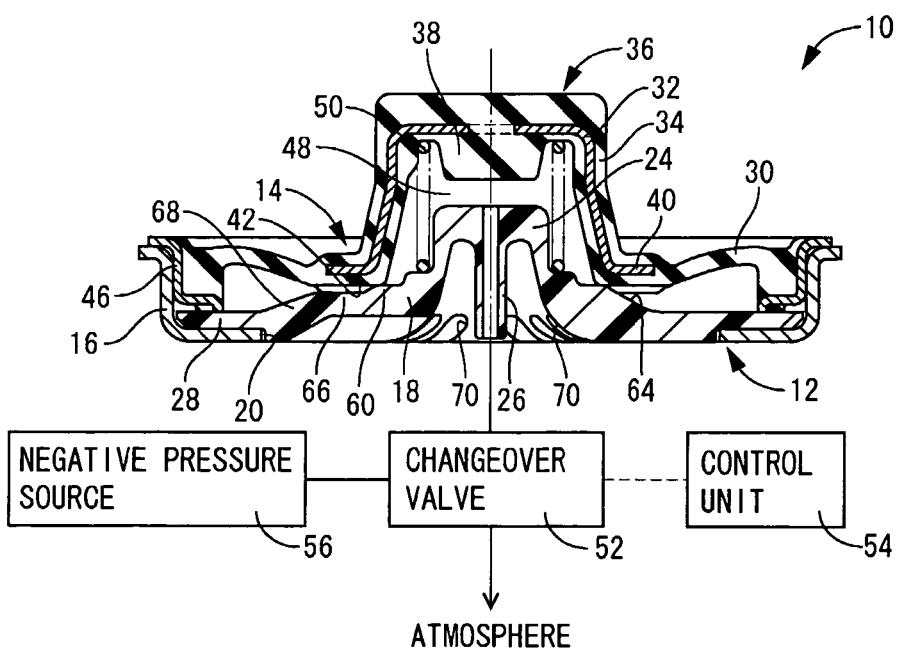
FIG. 11 is a cross sectional view of the negative pressure type actuator in the state where a relatively large negative pressure is applied to a working air chamber.

Here, as shown in FIGS. 10 and 11, in the negative pressure type actuator 10 of structure in accordance with the present embodiment, when negative pressure acts on the working air chamber 48 the elastic dividing wall 14 will be positioned in contact against the base plate member 18 at the edge of the opening of the output portion 36. Contact ribs 58 serving as rib projections are integrally formed on the base plate member 18 which makes up the base member 12, in the section thereof which is contacted by the elastic dividing wall 14.

Figure 4:
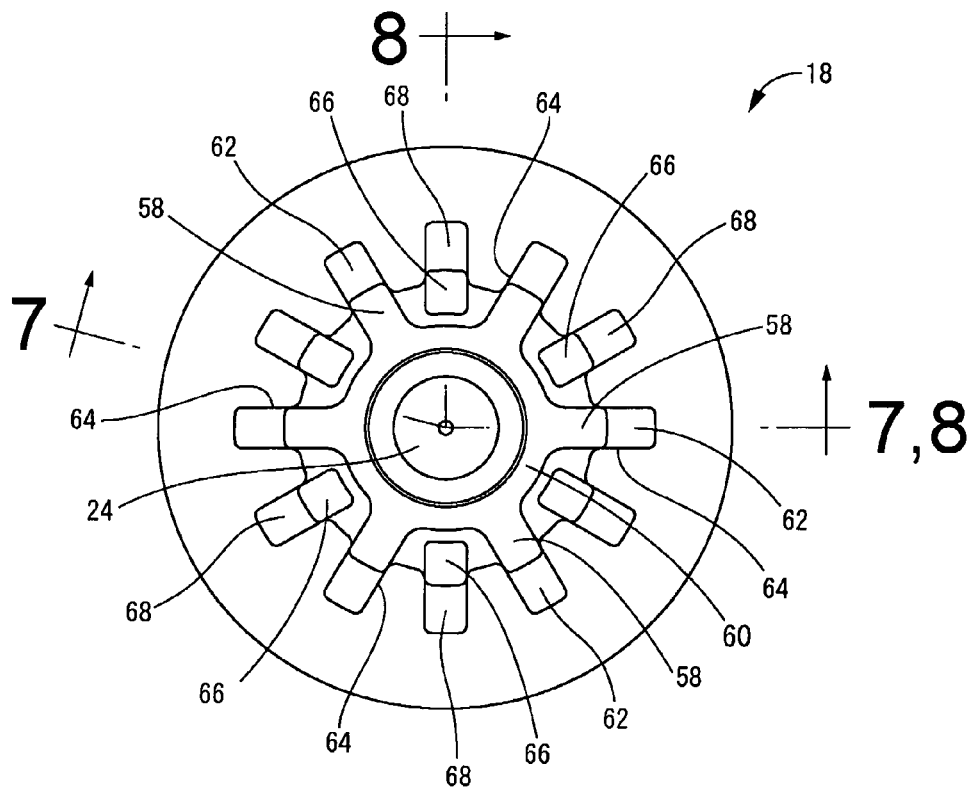
FIG. 4 is a top plane view of a base plate member of the negative pressure type actuator of FIG. 1.
Figure 6:
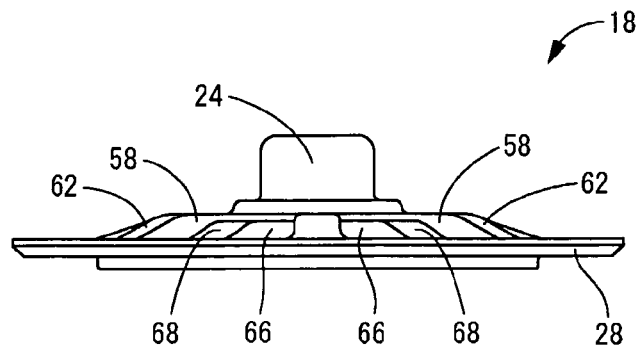
FIG. 6 is a front elevational view of the base plate member of FIG. 4.
Figure 7:
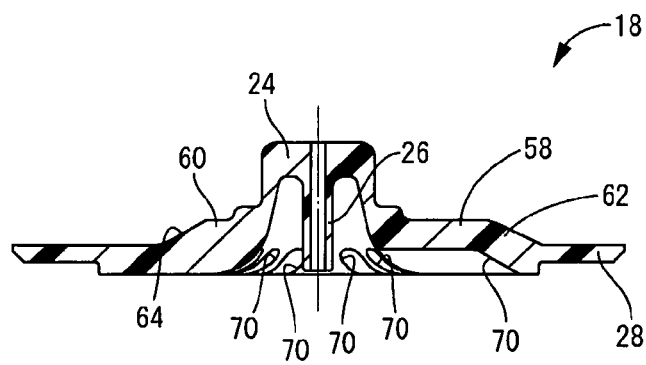
FIG. 7 is a cross sectional view of the base plate member, taken along line 7-7 of FIG. 4.

Specifically, as shown in FIGS. 4, 6, and 7, in the present embodiment, the contact ribs 58 are disposed extending in a straight line in the diametrical direction with rectangular cross section whose corners have been chamfered to rounded shape, and are disposed in the diametric medial section of the base plate member 18. In particular, the contact ribs 58 are formed in the diametrical center of the base plate member 18 and extend diametrically outward from the outer circumferential face of the center projecting portion 24, as far as the diametric medial section of the base plate member 18.

To describe in more detail, a striker plate for the coil spring 50 projects with annular contours at the perimeter of the center projecting portion 24. The contact rubber layer which is part of the sheath rubber 34 and which covers the lower face of the opening of the fastening flange 40 of the pressure fitting 32 is larger in diameter than this striker plate and does not contact the striker plate.

An annular contact portion 60, discussed later, is formed encircling the perimeter of the striker plate of the coil spring 50, and the plurality of contact ribs 58 are formed so as to extend diametrically outward respectively from a plurality of locations on the circumference of this annular contact portion 60. The fastening flange 40 of the pressure fitting 32 is positioned so as to be in contact, via the contact rubber layer, with the annular contact portion 60 and the contact ribs 58.

Particularly in the present embodiment the contact ribs 58 are formed to the inner circumferential side of the contact support portion 28 which has been disposed on the outer circumferential edge of the base plate member 18. The contact ribs 58 are defined by a plurality of ribs which extend in mutually different diametrical directions. As shown in FIG. 4, in the present embodiment, there are provided six contact ribs 58 spaced at equidistant intervals in the circumferential direction and extending radially.

Furthermore, as shown in FIG. 4 in the present embodiment, an annular contact portion 60 serving as an annular projecting portion which extends in the circumferential direction is formed at the inner circumferential ends of the contact ribs 58. The contact ribs 58 which are positioned spaced apart in the circumferential direction are interconnected by this annular contact portion 60. The annular contact portion 60 is formed with height equal to that of the contact ribs 58 and encircles the entire circumference of the seating section (striker plate) of the coil spring 50 to the outer circumferential side thereof.

In the present embodiment, the inside diameter dimension of the annular contact portion 60 which defines the inner circumferential section of the base plate member 18 is smaller than the inside diameter dimension of the diametric region which is contacted by the fastening flange 40 of the pressure fitting 32 via the contact rubber layer. The outer circumferential edge portion of the annular contact portion 60 is positioned in the diametric medial section of the diametric region which is contacted by the fastening flange 40 of the pressure fitting 32 via the contact rubber layer.

The plurality of communicating grooves 42 are formed at the lower end of the output portion 36 which contacts the annular contact portion 60, and with the base member 12 and the elastic dividing wall 14 in a state of contact, form tunnel-like passages which pass in the diametrical direction between the annular contact portion 60 and the output portion 36.

Meanwhile, at the outer circumferential ends of the contact ribs 58 there is integrally disposed a sloping portion 62. As shown in FIG. 7, the sloping portion 62 is defined as a sloping face whose upper end face, which constitutes its projecting distal end face, slopes downward towards the outer circumferential side so that its projecting height decreases gradually towards the outer circumferential side. In the present embodiment, the projecting distal end face of the sloping portion 62 is a sloping face which slopes downward at a generally constant angle towards the outer circumferential side.

Recessed portions 64 which define groove portions are formed between neighboring contact ribs 58 in the circumferential direction. These recessed portions 64 are valley-shaped recessed portions which have been formed between the upwardly projecting contact ribs 58. In the present embodiment, the wall faces at the inner circumferential side of the recessed portions 64 are defined as sloping faces which slope gradually downward towards the outer circumferential side.

Figure 8:
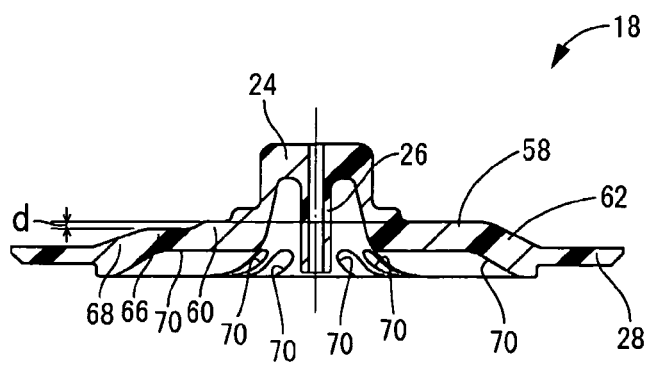
FIG. 8 is a cross sectional view of the base plate member, taken along line 8-8 of FIG. 4.

Bracing projections 66 are formed in the recessed portions 64. As shown in FIG. 8, the bracing projections 66 have a height dimension smaller by d than that of the contact ribs 58. In the present embodiment, like the contact ribs 58, they are defined by ribs which extend in a straight line towards the inner circumferential side from the diametric medial section of the base plate member 18.

Furthermore, the bracing projections 66 extend diametrically outward from the diametric medial section of the diametric region which is contacted by the fastening flange 40 of the pressure fitting 32 via the contact rubber layer. The contact ribs 58 and the bracing projections 66 are each formed such that their generally flat upper edge faces extend to the approximately outer circumferential edge of the diametric region which is contacted by the fastening flange 40 of the pressure fitting 32 via the contact rubber layer, from which point the sloping portions 62, 68 extend out with sloping faces which slope gradually downward.

The projecting height differential: d between the contact ribs 58 and the bracing projections 66 is not limited to any particular value but in preferred practice will be between about 0.5 mm and 5.0 mm. By so doing, it will be possible to effectively achieve stepwise contact of the elastic dividing wall 14 against the base member 12, as will be discussed later. The sloping portions 68 are disposed at the outer circumferential ends of the bracing projections 66. Like the contact ribs 58, these sloping portions 68 are gradually smaller in height towards the outer circumferential side, and their upper edge faces define sloping faces which slope downward towards the outer circumferential side.

Figure 5:
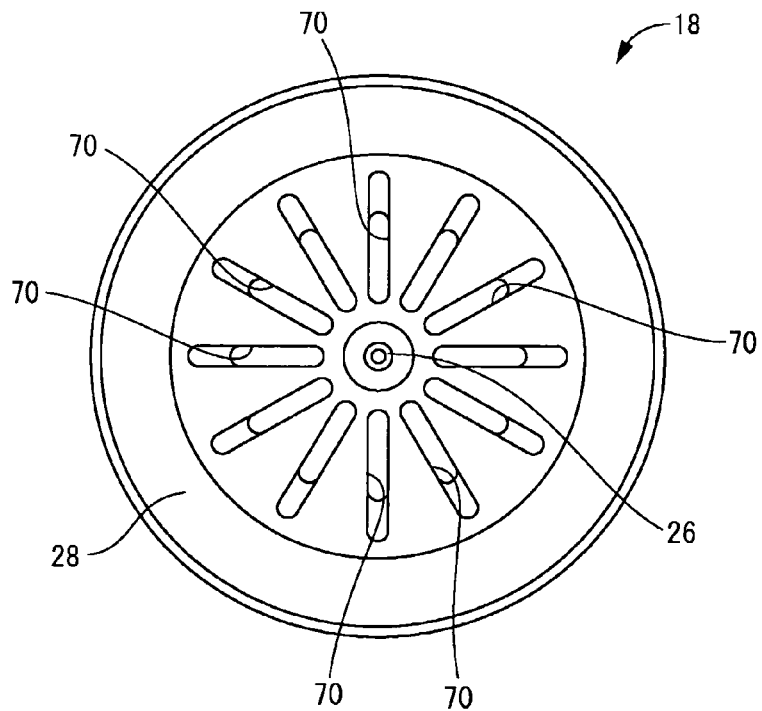
FIG. 5 is a bottom plane view of the base plate member of FIG. 4.

Lightening slots 70 are formed on the back face side of the base plate member 18 in the section thereof where the contact ribs 58 and the bracing projections 66 are formed. As shown in FIG. 5, the lightening slots 70 are formed in the base plate member 18 so as to open onto its back face at locations on the opposite side from the working air chamber 48 in the section where the contact ribs 58 and the bracing projections 66 have been formed. Like the contact ribs 58 and the bracing projections 66, the slots extend in straight lines in the diametrical direction. In the present embodiment, the lightening slots 70 are defined at the outer circumferential end of their bottom wall faces by sloping faces which slope downward towards the outer circumferential side, and at the outer circumferential end the lightening slots 70 become smaller in depth towards the outer circumferential side. Additionally, in this embodiment, six lightening slots 70 are formed at locations corresponding to the contact ribs 58, and six more lightening slots 70 are formed at locations corresponding to the bracing projections 66, for a total of twelve lightening slots 70 extending radially at equidistant intervals in the circumferential direction.

In the negative pressure type actuator 10 furnished with such a base plate member 18 of structure according to the present embodiment, when negative pressure acting on the working air chamber 48 brings the elastic dividing wall 14 closer to and in contact against the base plate member 18, the elastic dividing wall 14 will initially come into contact against the contact ribs 58 as shown in FIG. 10. The elastic dividing wall 14 and the base plate member 18 will come into partial contact thereby, and shock at the time of contact will be ameliorated. Accordingly, striking noise caused by contact between the elastic dividing wall 14 and the base plate member 18 can be reduced.

Then, as shown in FIG. 11, when the elastic dividing wall 14 moves from the state of initial contact into closer proximity with the base plate member 18, after contacting the contact ribs 58 it will then come into contact with the bracing projections 66. Through such partial stepwise contact of the elastic dividing wall 14 against the base plate member 18 in this way, the shock produced by contact can be dispersed and striking noise produced thereby can be kept to a minimum.

In the present embodiment in particular, the contact section on the elastic dividing wall 14 side is formed by the relatively thick sheath rubber 34, and in the embodiment the contact face with the base member 12 is defined by the lower face of this thick sheath rubber 34. It is possible thereby to advantageously achieve cushioned contact of the elastic dividing wall 14 and the base member 12.

In the present embodiment, moreover, the end faces on the inner circumferential side of the recessed portions 64 are defined by sloping faces which slope downward towards the outer circumferential side, and which slope gradually away from the contact face on the elastic dividing wall 14 side. Thus, the contact area at the time of initial contact between the elastic dividing wall 14 and the base plate member 18 can be made advantageously smaller. For this reason, shock produced by their contact can be diffused more advantageously and a reduction in striking noise can be effectively achieved. Furthermore, in the present embodiment, a multitude of minute projections 44 are formed on the elastic dividing wall 14 face which contacts the base plate member 18. Striking noise can be more advantageously reduced thereby.

In the present embodiment, the elastic dividing wall 14 is designed to come into contact with the outer circumferential edge portion of the annular contact portion 60 of the base plate member 18 so as to minimize contact area. Moreover, the inner circumferential edge portion of the output portion 36 which is placed in contact against the annular contact portion 60 is defined by curving contours which slope gradually upward towards the inner circumferential side. It is possible thereby to achieve a higher level of cushioning of contact between the elastic dividing wall 14 and the base plate member 18. Additionally, due to the presence of the plurality of communicating grooves 42 which open onto the annular contact portion 60, the contact area of the elastic dividing wall 14 against the annular contact portion 60 can be kept smaller.

On the other hand, when the air pressure inside the working air chamber 48 changes from negative pressure to atmospheric pressure, the elastic dividing wall 14 and the base plate member 18 which were positioned in contact with each other now separate. At this point, since the elastic dividing wall 14 and the base plate member 18 have been positioned in partial contact, noise occurring at the location of contact between the elastic dividing wall 14 and the base plate member 18 during separation will be reduced.

Furthermore, even where the base plate member 18 and the elastic dividing wall 14 have been positioned in contact with one another due to negative pressure, the space 48a to the inner circumferential side and the space 48b to the outer circumferential side of the location of contact between the elastic dividing wall 14 and the base plate member 18 will be maintained in a state of communication through the valley-shaped recessed portions 64, which have been formed between neighboring contact ribs 58 in the circumferential direction, and through the communicating grooves 42 which have been formed in the contact section of the elastic dividing wall 14. Thus, when the space to the inner circumferential side is exposed to the atmospheric pressure through the port 26, the air pressure throughout the entire working air chamber 48 will change to atmospheric pressure, and noise occurring due to the elastic dividing wall 14 being suctioned towards the base plate member 18 will be advantageously prevented.

Specifically, if the space to the inner circumferential side and the space to the outer circumferential side of the location of contact between the elastic dividing wall 14 and the base plate member 18 in the working air chamber 48 are isolated from one another, there exists a risk that even if the space to the inner circumferential side has been exposed to atmospheric pressure through the port 26, air pressure in the space to the outer circumferential side will be maintained at negative pressure and suctioning force caused by negative pressure will act between the elastic dividing wall 14 and the base plate member 18 in the outer circumferential section, thereby producing noise of magnitude sufficient to pose a problem during separation of the elastic dividing wall 14 and the base plate member 18. Accordingly, in the present embodiment, the space to the inner circumferential side and the space to the outer circumferential side are maintained in communication with one another so that the space to the outer circumferential side can be prevented from being placed a hermetic state and maintained at negative pressure, and noise occurring during release of negative pressure-induced suction of the elastic dividing wall 14 and the base plate member 18 can be reduced or eliminated.

Additionally, by forming lightening slots 70 in the base plate member 18 of the negative pressure type actuator 10, the negative pressure type actuator 10 of structure according to the present embodiment wherein the base plate member 18 is furnished with contact ribs 58 and bracing projections 66 can be implemented with relatively light weight.

Figure 12:
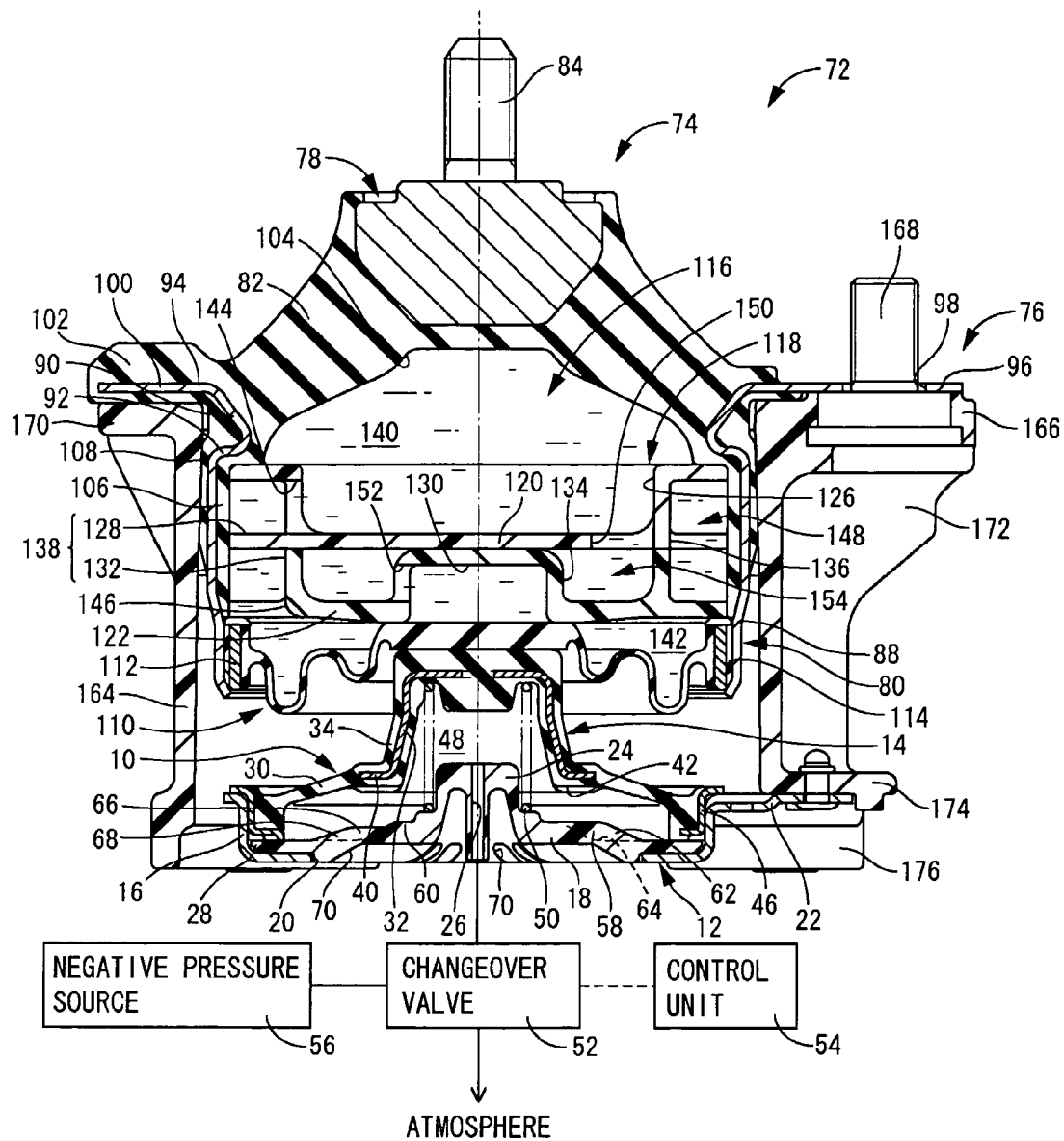
FIG. 12 is an elevational view in vertical cross section of an automotive engine mount according to one preferred embodiment of the present invention taken along line 12-12 of FIG. 13.
Figure 13:
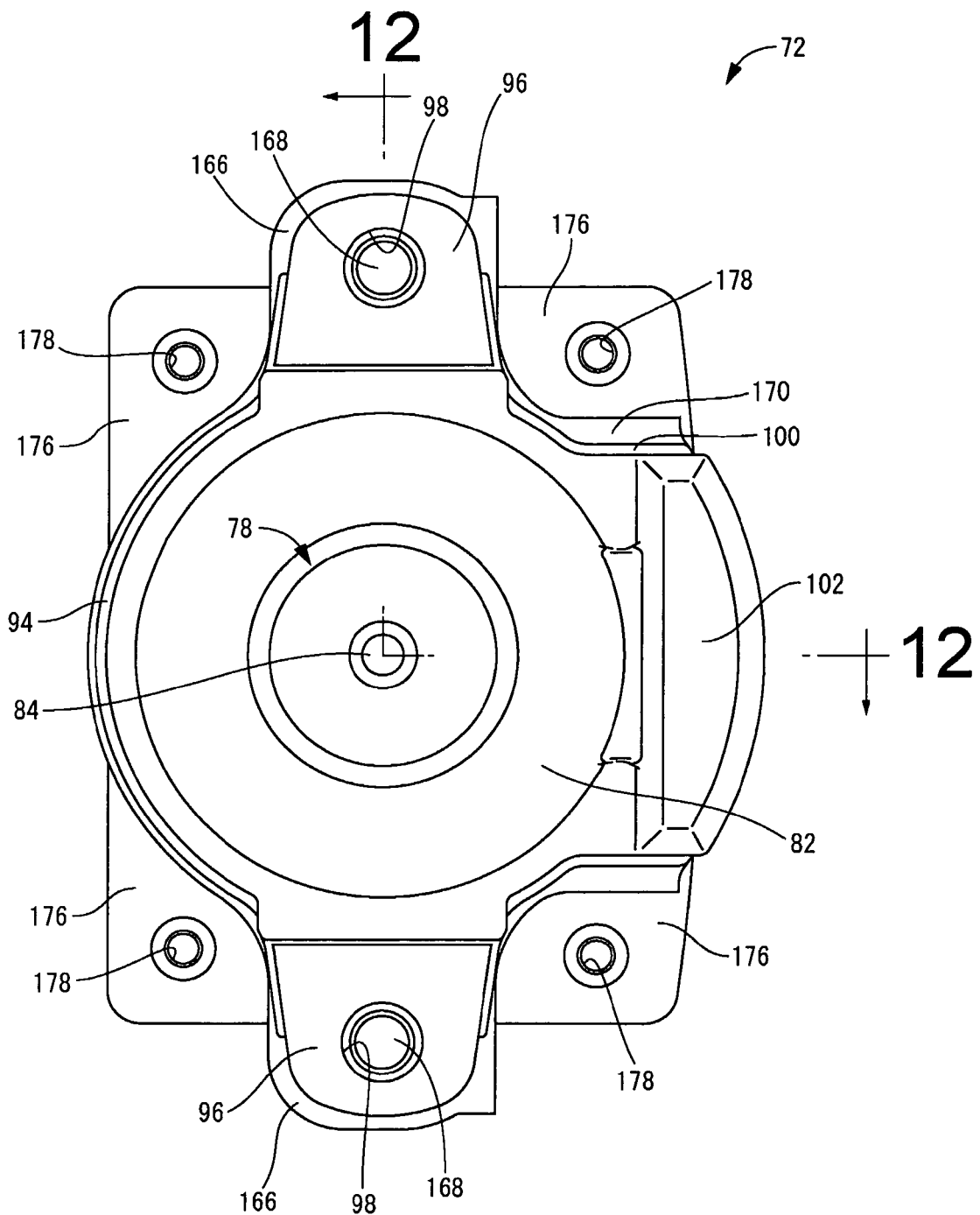
FIG. 13 is a top plane view of the engine mount of FIG. 12.

The negative pressure type actuator 10 of structure according to the present embodiment is adapted for use in an automotive engine mount 72 such as that shown in FIGS. 12 and 13 for example. This engine mount 72 has a structure in which a mounting main body 74 is fitted into a tubular bracket 76. The mounting main body 74 in turn has a structure in which a first mounting member 78 of metal, which constitutes the first mounting member and a second mounting member 80 of metal, which constitutes the second mounting member are linked by a main rubber elastic body 82, with the first mounting member 78 mounted onto a power unit, not shown, which constitutes one of the components making up a vibration transmission system, and with the second mounting member 80 mounted via the tubular bracket 76 onto the vehicle body, not shown, which constitutes the other component making up a vibration transmission system, thereby providing vibration damped support of the power unit on the vehicle body. In FIG. 12, the engine mount 72 is depicted in its state when not installed in the vehicle.

To describe in greater detail, the first mounting member 78 has a generally circular block shape, and in the present embodiment is fabricated of high-rigidity metal material such as iron or aluminum alloy. A mounting bolt 84 which projects upward is integrally formed at the upper end of the first mounting member 78. Then, for example, the mounting bolt 84 is threaded into a bracket, not shown, to fasten it to the power unit of the automobile via the bracket, thereby mounting the first mounting member 78 onto the power unit.

The second mounting member 80 has a large-diameter, generally round tubular shape, and like the first mounting member 78 is fabricated of high-rigidity metal material such as iron or aluminum alloy. The axial lower end section of the second mounting member 80 defines a tubular portion 88; and a tapered portion 90 which flares out gradually towards the upper end is disposed at the axial upper opening, with the tubular portion 88 and the tapered portion 90 being integrally formed via a shoulder portion 92 which extends towards the inner circumferential side from the upper end of the tubular portion 88. A groove-shaped constriction which opens onto the outer circumferential face of the second mounting member 80 is formed thereby in proximity to the upper opening of the second mounting member 80.

A flanged portion 94 is integrally formed about the entire circumference of the tapered portion 90 at the rim of its upper opening. A pair of fastening pieces 96, 96 which respectively project out towards the outer circumferential side are integrally formed on this flanged portion 94, at opposed locations along an axis lying in the diametrical direction, and bolt passage holes 98, 98 are provided in these fastening pieces 96, 96. A contact piece 100 which projects out towards the outer circumferential side is also integrally formed on this flanged portion 94 at one location on its circumference. The axial outside face of the contact piece 100 is covered by a cushion rubber 102, thereby constituting a bound stopper which is abutted by the mounting bracket on the power unit side, not shown.

The first mounting member 78 is positioned on the same center axis as the second mounting member 80 having the structure described above and positioned away from the opening on its axial upper side. The main rubber elastic body 82 is then positioned between the first mounting member 78 and the second mounting member 80 so that the first mounting member 78 and the second mounting member 80 are elastically linked by the main rubber elastic body 82.

The main rubber elastic body 82 has a frustoconical shape overall, and a bowl shaped, large-diameter recess 104 which opens downward is formed in its large-diameter end face. At the small-diameter end of the main rubber elastic body 82, the first mounting member 78, inserted so as to be embedded therein, has been vulcanization bonded thereto; while the second mounting member 80, positioned with the opening section on its axial upper side juxtaposed against the outer circumferential face at the large-diameter end of the main rubber elastic body 82, has been vulcanization bonded thereto. From the above description it will be appreciated that in the present embodiment the main rubber elastic body 82 is constituted as an integrally vulcanization molded component which incorporates the first mounting member 78 and the second mounting member 80. In the embodiment, the generally entire inner circumferential face of the tapered portion 90 is affixed to the outer circumferential face of the main rubber elastic body 82, and the opening at the axial upper end of the second mounting member 80 is blocked off fluidtightly by the main rubber elastic body 82. A large-diameter recess 104 opens to the inner circumferential side of the second mounting member 80.

Furthermore, a sealing rubber layer 106 is affixed to the inner circumferential face of the second mounting member 80. This sealing rubber layer 106 is integrally formed with the main rubber elastic body 82 and has a thin-walled tubular shape which extends downward from the rim of the opening of the large-diameter recess 104 so as to cover the tubular portion 88 of the second mounting member 80 from its upper end to its medial section in the axial direction.

A rubber sleeve 108 is affixed to the outer circumferential face of the second mounting member 80. The rubber sleeve 108 is formed by a rubber elastic body having thin-walled, large-diameter generally circular tube shape, and is formed on the outer circumferential face of the second mounting member 80 so as to cover it from the axial upper end to the axial medial section. The rubber sleeve 108 in the section which is affixed to the outer circumferential face of the tubular portion 88 projects further towards the outer circumferential side than the section which is affixed to the outer circumferential face of the tapered portion 90; with the mounting main body 74 assembled with the tubular bracket 76 as discussed later, the lower portion of the rubber sleeve 108 which has been affixed to the outer circumferential face of the tubular portion 88 will be pressed into contact against the tubular bracket 76, while the upper portion of the rubber sleeve 108 which has been affixed to the outer circumferential face of the tapered portion 90 will be positioned spaced apart to the inner circumferential side of the tubular bracket 76.

A diaphragm 110 which constitutes the flexible film is attached to the second mounting member 80. The diaphragm 110 is a rubber film having a generally circular disk shape overall which in its center section is relatively thick, while its outer circumferential section is thin and has wavy pattern of slack which makes it readily deformable. A fastening fitting 112 of generally annular shape is vulcanization bonded to the outer circumferential section of the diaphragm 110. As will be apparent from the above, in the present embodiment the diaphragm 110 takes the form of an integrally vulcanization molded component which incorporates the fastening fitting 112.

The fastening fitting 112 is slipped inside the lower opening of the second mounting member 80, and the second mounting member 80 is then subjected to a diameter reduction process such as 360-degree radial compression thereby securing the diaphragm 110 so that it covers the lower opening of the second mounting member 80. The fastening fitting 112 is positioned fitting in the second mounting member 80 below the section which has been covered by the sealing rubber layer 106, and the fastening fitting 112 is attached fluidtightly to the second mounting member 80 via a sealing rubber 114 which has been formed covering the outer circumferential face of the fastening fitting 112.

With this arrangement, a first axial opening of the second mounting member 80 is blocked off fluidtightly by the main rubber elastic body 82 while the other opening is blocked off fluidtightly by the diaphragm 110, thereby defining between the axially opposed faces of the main rubber elastic body 82 and the diaphragm 110 to the inner circumferential side of the second mounting member 80a fluid chamber 116 which is isolated from the outside space and which is filled with a noncompressible fluid. Filling of the fluid chamber 116 with the noncompressible fluid may be accomplished advantageously, for example, by carrying out the operation of assembling the diaphragm 110 and a partition member 118, to be discussed later, to the second mounting member 80 while they are they are submerged in the noncompressible fluid. The noncompressible fluid filling the fluid chamber 116 is not limited to any particular one; however, in order to advantageously achieve vibration damping action based on the flow effect of fluid, discussed later, it is preferable to use a low-viscosity fluid having viscosity of 0.1 Pa·s or lower, for example, water, an alkylene glycol, a polyalkylene glycol, silicone oil, a mixture of these, or the like.

The partition member 118 is positioned housed within the fluid chamber 116 and supported by the second mounting member 80. The partition member 118 is a thick, generally circular disk; in the present embodiment it includes a first partition member 120 and a second partition member 122.

To describe in more detail, the first partition member 120 has a generally circular disk shape, and in the present embodiment is fabricated of hard synthetic resin material. In the diametrical center section of the first partition member 120 is formed a large-diameter center recess 126 which opens on the upper face. A first circumferential groove 128 which opens onto the outer circumferential face of the first partition member 120 is formed in its outer circumferential section and extends for a length just short of once around the circumference so as to encircle the center recess 126 to its outer circumferential side.

The second partition member 122 has a generally circular disk shape, and in the present embodiment is fabricated of hard synthetic resin material similar to that of the first partition member 120. In the diametrical center section of the second partition member 122 there is formed a small-diameter communication recess 130 which opens onto the lower end face. A second circumferential groove 132 which opens onto the outer circumferential face and upper end of the second partition member 122 is formed in its outer circumferential section, and extends for a length just short of once around the circumference so as to encircle the communication recess 130 to its outer circumferential side. At a location diametrically between the communication recess 130 and the second circumferential groove 132 there is formed a center slot 134 which opens onto the upper end face of the second partition member 122 and which extends for a length just short of once around the circumference.

The first partition member 120 and the second partition member 122 are then stacked top and bottom in the axial direction on the same center axis to define the partition member 118 of generally thick, circular disk shape overall. In the present embodiment, the first partition member 120 and the second partition member 122 have approximately identical outside diameter.

With the first and second partition members 120, 122 in the assembled state, the opening on the upper end face side of the second circumferential groove 132 which has been formed in the second partition member 122 will be covered by the first partition member 120, forming a groove pattern in which the second circumferential groove 132 opens onto the outer circumferential face. Consequently, the first circumferential groove 128 and the second circumferential groove 132 which open onto the outer circumferential face and which each extend for a length just short of once around the circumference on the outer circumferential edge of the partition member 118 will be formed independently of one another above and below in the axial direction. Furthermore, the first circumferential groove 128 and the second circumferential groove 132 are formed with their two circumferential ends aligned in the circumferential direction so as to communicate with one another at a first circumferential end through a connection hole 136 which has been formed through the lower wall portion of the first circumferential groove 128. The first circumferential groove 128 and the second circumferential groove 132 thereby define a circumferential 138 which opens onto the outer circumferential face and which extends for a length just short of twice around the circumference.

The partition member 118 having the structure described above is arranged between the axially opposed faces of the main rubber elastic body 82 and the diaphragm 110 to the inner circumferential side of the second mounting member 80. Specifically, prior to attaching the diaphragm 110 to the second mounting member 80, the partition member 118 is inserted into the second mounting member 80 through the opening at its axial lower end and is positioned to the inner circumferential side of the tubular portion 88. Then, the diaphragm 110 is inserted from below in the axial direction and juxtaposed against the partition member 118 from below. At this time the fastening fitting 112 of the diaphragm 110 will be positioned in contact against the lower end face of the partition member 118 via the sealing rubber 114, and the upper end face of the outer circumferential edge of the partition member 118 will be positioned in contact from below against the edge of the opening of the large-diameter recess 104 of the main rubber elastic body 82, whereby the partition member 118 and the diaphragm 110 may be easily positioned in the axial direction with respect to the second mounting member 80. Then, with the partition member 118 and the diaphragm 110 fitted inside the second mounting member 80, the second mounting member 80 is subjected to a diameter reduction process such as 360-degree radial compression or drawing using a die divided into eight circumferential parts, thereby securing partition member 118 and the diaphragm 110 fitting inside the second mounting member 80.

In the present embodiment, the outer circumferential face of the partition member 118 is juxtaposed via the sealing rubber layer 106 against the inner circumferential face of the second mounting member 80, providing a fluidtight seal between the second mounting member 80 and the partition member 118. In the present embodiment, when subjecting the second mounting member 80 to the diameter reduction process, the extent of diameter reduction of the section where the diaphragm 110 fits inside will be greater in comparison with the section where the partition member 118 fits inside. It is possible thereby to effectively fasten the partition member 118 and the diaphragm 110 while preventing damage to the synthetic resin partition member 118. Furthermore, during the diameter reduction process of the second mounting member 80, by working the lower end portion of the second mounting member 80 into a tapered shape which gradually constricts in diameter towards the lower side the diaphragm 110 can be prevented advantageously from coming through the bottom.

With the partition member 118 in the assembled state as described above, the fluid chamber 116 will be bifurcated into upper and lower parts by the partition member 118 which has been arranged extending in the axis-perpendicular direction. Thereby, to one side of the partition member 118 in the axial direction (the upper side in FIG. 12) there is formed a pressure receiving chamber 140a portion of whose wall is defined by the main rubber elastic body 82 and which is subjected to internal pressure fluctuations at times of input of vibration; and to the other side of the partition member 118 (the lower side in FIG. 12) there is formed an equilibrium chamber 142a portion of whose wall is defined by the diaphragm 110 and which permits changes in volume.

The outer circumferential opening of the circumferential groove 138 which has been formed on the partition member 118 is blocked off by the second mounting member 80, and utilizing the circumferential groove 138 there is formed a tunnel-like passage which extends for a prescribed length in the circumferential direction. The tunnel-like passage at first end communicates with the pressure receiving chamber 140 through a communication hole 144 which passes through the wall in the diametrical direction towards the inner circumferential side at the end of the first circumferential groove 128, and at the other end communicates with the equilibrium chamber 142 through a communication hole 146 which passes axially downward through the wall at the end of the second circumferential groove 132. Utilizing the circumferential groove 138 there is defined a first orifice passage 148 which extends for a prescribed distance in the circumferential direction, through which the pressure receiving chamber 140 and the equilibrium chamber 142 communicate with one another. In the present embodiment, the resonance frequency (tuning frequency) of the fluid induced to flow through the first orifice passage 148 is tuned to a low frequency band of around 10 Hz, which corresponds to engine shake of the automobile.

Furthermore, by attaching the first partition member 120 and the second partition member 122 while juxtaposed in the axial direction to the second mounting member 80, the opening of the center slot 134 which has been formed in the diametrical center section of the second partition member 122 will be covered and blocked off by the first partition member 120. Utilizing the center slot 134 there is defined a tunnel-like passage which extends for a length just short of once around the circumference. The tunnel-like passage at first end communicates with the pressure receiving chamber 140 through a communication hole 150 which passes in the axial direction through the bottom wall at the outer circumferential edge of the center recess 126, and at the other end communicates with the equilibrium chamber 142 through a communication hole 152 which passes in the diametrical direction through the peripheral wall of the communication recess 130. Utilizing the center slot 134 there is defined thereby a second orifice passage 154 through which the pressure receiving chamber 140 and the equilibrium chamber 142 communicate through a passage shorter in length than the first orifice passage 148. This second orifice passage 154 is tuned so as to produce vibration damping action against vibration of a higher frequency band than the first orifice passage 148; in the present embodiment, it is tuned to produce effective vibration damping action against vibration of a medium frequency band on the order of between 20 and 40 Hz which corresponds to idling vibration that may pose a problem when the automobile is at a stop. Through proper setting of the ratio of passage cross sectional area to passage length of the orifice passages 148, 154, the tuning frequencies of orifice passages 148, 154 can be set to prescribed frequency depending on the vibration targeted for damping.

The mounting main body 74 of the structure described above is assembled together with the tubular bracket 76. The tubular bracket 76 has a large-diameter, generally round tube shape overall and will preferably be fabricated of hard synthetic resin material reinforced with glass fibers or the like, or of a metal material such as aluminum alloy. The tubular bracket 76 according to the present embodiment has greater length in the axial direction than does the second mounting member 80.

The tubular bracket 76 also has a tubular main body 164 of large-diameter, round tubular shape. In the present embodiment, the inner circumferential face of the tubular main body 164 is defined by a pair of upper and lower tapered faces which have mutually different directions of slope, with the inside diameter of the tubular main body 164 increasing gradually towards the outside in the axial direction. While not necessarily clear from the drawings, at the connecting section of the pair of upper and lower tapered faces there is formed an apical portion of ridgeline contours which is convex towards the inner circumferential side, so that in longitudinal cross section the inner circumferential section of the tubular main body 164 has a beaked shape. By setting the mating faces of the upper and lower molds of the mold for molding the tubular bracket 76 at a prescribed location in the axial direction, the pair of tapered faces can be utilized advantageously as tapers for release from the mold.

At the upper end of the tubular bracket 76, at locations situated in opposition on an axis lying in the diametrical direction, there are formed a pair of fastening support pieces 166, 166 which extend out to the outer circumferential side, with a fastening bolt 168 affixed to each. The fastening bolt 168 is disposed projecting upward from the fastening support piece 166 which has been integrally formed with the tubular main body 164, with the head of the bolt affixed to the fastening support piece 166. Additionally, a contact support piece 170 is formed extending towards the outer circumferential side along an axis in the diametrical direction which is orthogonal to the direction of opposition of the pair of fastening support pieces 166, 166. Furthermore, a reinforcing rib 172 for reinforcing the fastening support pieces 166 and the contact support piece 170 is integrally formed on the outer circumferential face of the tubular main body 164.

At the lower end of the tubular bracket 76, a pair of mounting support pieces 174, 174 are formed at locations situated in opposition on an axis lying in the diametrical direction. The mounting support pieces 174 have tabular contours which extend to either side in the diametrical direction from the edge of the lower end opening of the tubular main body 164 of the tubular bracket 76; and have a rivet passage hole formed in the medial section. In the present embodiment, the tubular main body 164 will have shorter axial length in the sections thereof where the mounting support pieces 174 have been formed along the circumference of the tubular main body 164, and at the mounting support piece 174 formation locations the lower end face of the tubular bracket 76 will be positioned higher than in other sections.

At the lower end of the tubular main body 164 there are disposed four support leg portions 176 which extend towards the outer circumferential side, and a circular through-hole 178 is formed in each support leg portion 176. With the mounting main body 74 in the installed state, discussed later, the second mounting member 80 will be mounted on the vehicle body of the automobile via the tubular bracket 76, by threading bolts which have been passed through the circular through-holes 178 into nuts which have been provided on the vehicle body, not shown, for example.

This tubular bracket 76 is secured fitting externally onto the mounting main body 74. Specifically, in the present embodiment, the second mounting member 80 is slipped inside the tubular main body 164 of the tubular bracket 76 with a gap between them, and with the rubber sleeve 108 interposed in the gap between the opposed faces of the second mounting member 80 and the tubular bracket 76 so as to be compressed between them in the diametrical direction. The mounting main body 74 is thereby secured fitting to the upper end section of the tubular bracket 76. In the present embodiment, the rubber sleeve 108 will be pressed into contact against the tapered face which, of the upper and lower tapered faces which define the inner circumferential face of the tubular bracket 76, is the one situated to the lower side of the apical portion which is convex towards the inner circumferential side; and the problem of the mounting main body 74 becoming dislodged from the tubular bracket 76 in the upward direction can be avoided advantageously thereby.

The negative pressure type actuator 10 is secured inserted in the lower end portion of the tubular bracket 76 from its lower opening. Specifically, the pair of mounting pieces 22, 22 which have been disposed on the base fitting 16 are juxtaposed against the pair of mounting support pieces 174, 174 which have been formed at the lower end of the tubular bracket 76 and fastened to these with fastening members such as bolts or rivets, thereby securing the negative pressure type actuator 10 to the tubular bracket 76.

The negative pressure type actuator 10 and the mounting main body 74 are then installed in the tubular bracket 76, thereby positioning the negative pressure type actuator 10 below the mounting main body 74; and the output portion 36 of the elastic dividing wall 14 is juxtaposed against the relatively thick center section of the diaphragm 110 from axially below it, on the opposite side of the diaphragm 110 from the equilibrium chamber 142.

In the engine mount 72 having a structure like that described above, when the working air chamber 48 is subjected to the action of atmospheric pressure from outside, the center section of the diaphragm 110 will be pushed axially upward by the output portion 36 of the elastic dividing wall 14 through the urging force of the coil spring 50, and will be positioned in intimate contact with the opening of the communication recess 130 which is the opening of the second orifice passage 154 on the equilibrium chamber 142 side. When the air pressure of the working air chamber 48 has thereby reached atmospheric pressure, the opening of the second orifice passage 154 on the equilibrium chamber 142 side will be blocked off by the output portion 36 via the diaphragm 110, placing the second orifice passage 154 in the obstructed state.

On the other hand, if negative pressure acts on the working air chamber 48 from outside, the output portion 36 of the elastic dividing wall 14 will undergo actuated displacement downward in the axial direction, and the pressing force on the diaphragm 110 by the output portion 36 will be released. The opening of the second orifice passage 154 on the equilibrium chamber 142 side will open thereby, and the second orifice passage 154 will assume the communicating state.

In the automotive engine mount 72 which pertains to the present embodiment, the second orifice passage 154 is switched by the negative pressure type actuator 10 between the communicating state and the obstructed state in this way, and its vibration damping characteristics change according to the input vibration. Specifically, at times of input of vibration having a low-frequency band which corresponds to engine shake the working air chamber 48 will be subjected to the action of atmospheric pressure from outside, obstructing the second orifice passage 154 so that the level of flow of the fluid induced to flow through the first orifice passage 148 will be advantageously assured, and vibration damping action will be advantageously achieved through the resonance effect or similar flow effects of fluid induced to flow through the first orifice passage 148. On the other hand, at times of input of vibration in a medium-frequency band which corresponds to idling vibration negative pressure will act on the working air chamber 48 from outside and the second orifice passage 154 will open up, whereby vibration damping action will be advantageously achieved through the resonance effect or similar flow effects of fluid induced to flow through the second orifice passage 154.

Particularly in the automotive engine mount 72 having the structure according to the present embodiment, where the negative pressure type actuator 10 advantageously affording a high level of silence during actuation due to being provided with the contact ribs 58 is employed as the means for switching the vibration damping characteristics of the mounting main body 74, it will be possible to achieve excellent vibration damping capabilities through switching of these characteristics while at the same time achieving a high level of quiet in the passenger cabin.

While the present invention has been shown herein through a preferred embodiment, this is merely illustrative and the present invention should not be construed as being limited in any way to the specific disclosure of this embodiment.

For example, whereas the preceding embodiment describes an example in which the contact ribs 58 serving as the rib portions are formed on the base plate member 18, the rib portions could instead be formed on the elastic dividing wall 14 side. In this case, it will be preferable to form the rib portions in such a way that they do not hamper deformation of the elastic dividing wall 14, and while hard rib portions may be preferable for them to be integrally formed with the elastic dividing wall 14 by a rubber elastic body. Of course, rib portions could also be provided as separate member which are attached later through adhesive or other means.

In the preceding embodiment, the contact ribs 58 include an inner circumferential section which extends with generally unchanging height, and a sloping portion 62 which gradually decreases in height towards the outer circumferential side. However, the contact ribs 58 could instead have generally unchanging height along the entire diametrical direction which is their lengthwise direction; or have a sloping portion that changes height along their entire length.

In the preceding embodiment, the sloping portion 62 of the contact rib 58 has a shape in which the upper edge face is defined by a flat sloping face which slopes at a generally constant rate; however, the contact rib 58 could instead have a shape in which the upper edge face is a bowed sloping face having a increasing slope angle with respect to the horizontal going towards the outer circumferential side, or otherwise have a degree of slope which changes in the lengthwise direction. Where the rate of slope changes, it will be preferable for the change to be gradual or stepwise.

The contact ribs 58 may also have varying width dimension in addition to varying height in the lengthwise direction. That is, whereas in preceding embodiment the contact ribs 58 extend with generally unchanging width, they could instead constrict in width towards the outer circumferential side, for example.

Furthermore, while in the preceding embodiment the contact ribs 58 have an angled rectangular cross section, the cross sectional shape of the cross section is not limited to any particular shape, and it would be acceptable to have a cross section of gentle sloping hill shape or semicircular shape, for example.

The various designs mentioned above in relation to the rib portions are applicable analogously in relation to the bracing projections 66. Specifically, it is possible for the bracing projections 66 to be provided on the elastic dividing wall 14 side; for their sloping portion 68 to have a bowed sloping face on the upper face; or to have a cross section of undulating shape such as a sloping hill shape or semicircular shape for example. Additionally, their height and width, in other words their cross sectional shape, may change in the lengthwise direction.

Furthermore, in the preceding embodiment, bracing projections 66 which extend in the diametrical direction are shown by way of example of the bracing projections; however, the bracing projections 66 could instead be of a projecting shape formed so as project from the bottom wall of the recessed portions 64, for example.

Moreover, whereas in the preceding embodiment the lightening slots 70 have a shape which corresponds to the shape of the contact ribs 58 and the bracing projections 66, i.e. an inner circumferential section having generally unchanging cross sectional shape and an outer circumferential section of a shape which becomes gradually shallower towards the outer circumferential side, the shape of the lightening slots 70 is not limited in any particular way, and it would be possible for them to have a shape which does not correspond to the shape of the contact ribs 58 and the bracing projections 66. For example, the outer circumferential section need not have a shape which becomes gradually shallower in depth, and could instead have unchanging cross sectional shape along its entire length; or its width and height could vary along the lengthwise direction. Where the rib portions have been formed on the elastic dividing wall side, the lightening slots 70 will be formed on the elastic dividing wall side as well.

The number of the contact ribs 58, the bracing projections 66, and the lightening slots 70 are not limited in any way to the specific numbers shown in the preceding embodiment. Specifically, any plural number of contact ribs 58 may be formed, whereas for the bracing projections 66 and the lightening slots 70, these may be eliminated altogether, or formed in single or plural number.

Moreover, in the preceding embodiment the base member 12 serving as the base housing includes the base fitting 16 and the base plate member 18. However, the base housing need not be composed of multiple components; the based housing could instead be formed, for example, from a single metal component of shallow, bottomed tubular shape by forming rib portions etc. on its bottom wall portion through a pressing operation or the like. In the preceding embodiment, the base member 12 is composed of a base fitting 16 fabricated of metal material such as iron or aluminum, and a base plate member 18 fabricated from hard synthetic resin material; however, the base fitting 16 and the base plate member 18, which are independent components, could each be fabricated of the same metal material such as iron or aluminum.

Furthermore, in the preceding embodiment the pressure fitting 32 is affixed embedded into the diametrical center section of the elastic dividing wall 14 which serves as the elastic wall member, whereby the contact location of the elastic dividing wall 14 against the base plate member 18 is reinforced by the pressure fitting 32, restricting its deformation. However, the elastic dividing wall 14 furnished with this sort of pressure fitting 32 is merely one embodiment of the elastic wall member in the present invention; by instead employing an elastic wall member which is composed entirely of a rubber elastic body for example, it would be possible to ameliorate the shock at contact could be more advantageously, or to advantageously permit elastic deformation of the elastic wall member as a whole rather than hindering it, thereby relieving concentration of stress and effectively improving durability.

Figure 14:
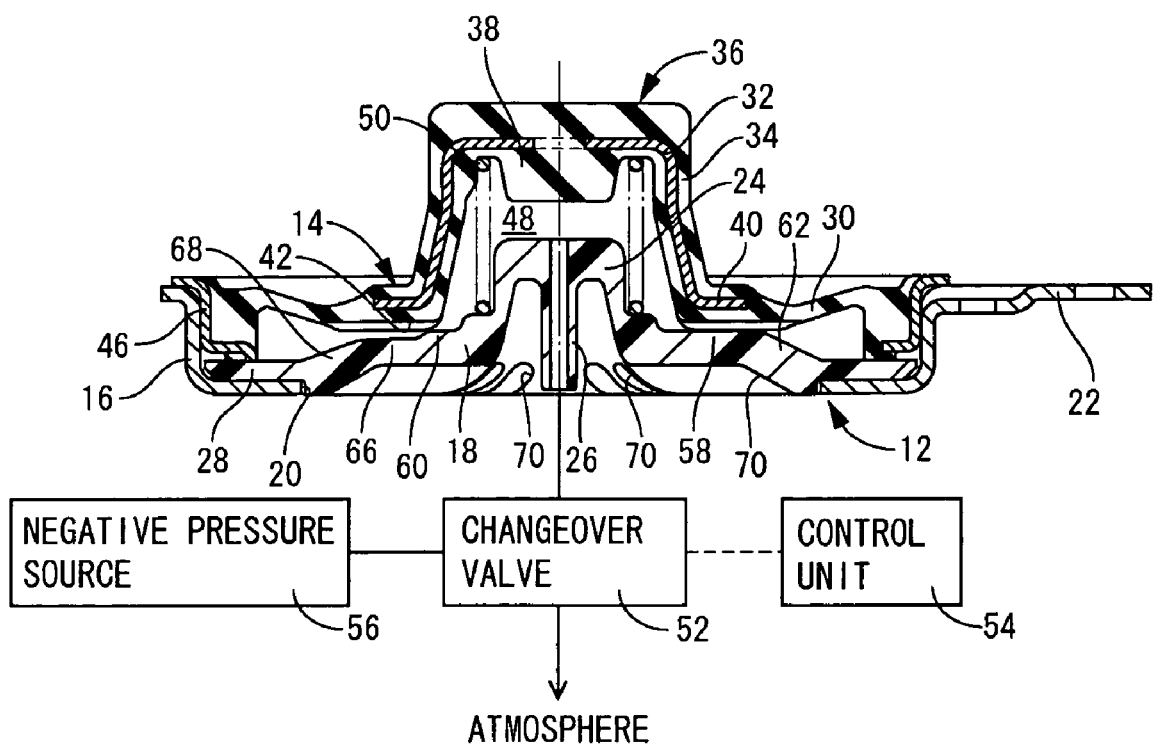
FIG. 14 is an elevational view in vertical cross section of the negative pressure type actuator according to another embodiment of the present invention.

In the present embodiment, the elastic dividing wall 14 and the base plate member 18 are positioned in contact to the inner circumferential side of the sloping portions 62, 68, but the elastic dividing wall 14 could instead be placed in contact against the sloping portions 62, 68 as depicted in FIG. 14, for example. With this arrangement, the contact face on the base plate member 18 side will be sloped with respect to the contact face on the elastic dividing wall 14 side so that the area of contact can be advantageously minimized during initial contact between the elastic dividing wall 14 and the base plate member 18. For this reason shock at the time of contact can be dispersed more advantageously, and striking noise can be effectively reduced. In the embodiment of the invention shown in FIG. 14, parts and regions substantially identical to those in the preceding embodiment have been assigned the same symbols in the drawings and are not discussed in any detail.

Furthermore, whereas the preceding embodiment describes the structure of an automotive engine mount 72 by way of example of a fluid filled type vibration damping device pertaining to the invention, this device is merely exemplary and the invention should in no way be construed as being limited to the specific disclosure of the embodiment herein. That is, the specific structures of the mounting main body 74, the tubular bracket 76, and other components may be designed appropriately according to the required vibration damping characteristics, the structure of the section for mounting onto components targeted for damping, and other considerations. As specific examples, it would be possible to employ a mounting main body furnished with a liquid pressure absorbing mechanism such as a moveable film or moveable plate for absorbing internal pressure in the pressure receiving chamber by allowing it to escape into the equilibrium chamber; a mounting main body having three or more orifice passages; a tubular bracket having a different mounting structure to a component targeted for damping or mounting structure to the mounting main body, and so on. Furthermore, the mounting structure of the negative pressure type actuator 10 to the tubular bracket 76 shown in the embodiment herein should not be construed as limiting in any way.

It is also to be understood that the present invention may be embodied with various other changes, modifications and improvements, which may occur to those skilled in the art, without departing from the spirit and scope of the invention defined in the following claims.

What is claimed is:

1. A pneumatic actuator for use in a vibration damping device comprising:
   a base housing;
   an elastic wall member being fastened fluid-tightly to the base housing to form a working air chamber therebetween; and
   an urging member positioned within the working air chamber for exerting urging force on an output portion provided to the elastic wall member, such that the output portion is actuated to undergo displacement in opposition to the urging member through change in an air pressure in the working air chamber from an outside, wherein
   the base housing, on the working air chamber side thereof, has a plurality of rib portions which extend from an inner circumferential side thereof towards an outer circumferential side thereof, and
   an annular projecting portion, which continuously extends in a circumferential direction, is formed on the base housing, and the plurality of rib portions are formed so as to extend diametrically outward respectively from a plurality of locations on a circumference of the annular projecting portion.

2. The pneumatic actuator according to claim 1, wherein a communicating groove, which extends in a diametrical direction, is formed on at least one of contact faces of the elastic wall member and the annular projecting portion.

3. The pneumatic actuator according to claim 1, wherein outer circumferential ends of the plurality of rib portions are formed of length that does not reach as far as an outer circumferential edge of the base housing.

4. The pneumatic actuator according to claim 3, wherein projecting distal end faces of the outer circumferential ends of the plurality of rib portions are sloping faces which gradually decrease in height towards the outer circumferential side.

5. The pneumatic actuator according to claim 1, wherein lightening slots are formed on a back side of the base housing so that the lightening slots are positioned behind locations where the plurality of rib portions have been provided.

6. The pneumatic actuator according to claim 1, wherein bracing projections which are lower in height than the plurality of rib portions are formed between neighboring rib portions of the plurality of rib portions in the circumferential direction.

7. The pneumatic actuator according to claim 6, wherein lightening slots are formed on a back side of the base housing so that the lightening slots are positioned behind locations where the bracing projections have been provided.

8. The pneumatic actuator according to claim 1, further comprising elastic projections formed projecting on a base housing-contacting face of the elastic wall member.

9. The pneumatic actuator according to claim 1, wherein with the base housing and the elastic wall member in a state of contact, a zone to the inner circumferential side and a zone to the outer circumferential side of a contact location of the base housing and the elastic wall member in the working air chamber are maintained in a state of communication with one another through recessed portions which have been formed between adjacent rib portions of the plurality of rib portions in the circumferential direction.

10. A fluid filled type vibration damping device comprising:
   a first mounting member;
   a second mounting member of tubular shape such that the first mounting member is positioned with a distance on a side of a first opening of the second mounting member;
   a main rubber elastic body by which the first mounting member and the second mounting member are linked together such that the first opening of the second mounting member is blocked off by the main rubber elastic body;
   a flexible film by which another opening of the second mounting member is blocked off, thereby forming between the main rubber elastic body and the flexible film a fluid chamber filled with a non-compressible fluid;
   a partition member arranged in the fluid chamber and fixedly supported by the second mounting member thereby forming to either side of the partition member a pressure receiving chamber a portion of whose wall is defined by the main rubber elastic body and which is affected by internal pressure fluctuations, and an equilibrium chamber a portion of whose wall is defined by the flexible film and which readily permits changes in volume;
   a first orifice passage which connects the pressure receiving chamber and the equilibrium chamber;
   a second orifice passage which is tuned to a higher frequency band than the first orifice passage, the first and second orifice passages being formed in the partition member; and
   a pneumatic actuator including a base housing, an elastic wall member being fastened fluid-tightly to the base housing to form a working air chamber therebetween, and an urging member positioned within the working air chamber for exerting urging force on an output portion provided to the elastic wall member, such that the output portion is actuated to undergo displacement in opposition to the urging member through change in an air pressure in the working air chamber from an outside, wherein
   the base housing, on the working air chamber side thereof, has a plurality of rib portions which extend from an inner circumferential side thereof towards an outer circumferential side thereof, and an annular projecting portion, which continuously extends in a circumferential direction, is formed on the base housing, and the plurality of rib portions are formed so as to extend diametrically outward respectively from a plurality of locations on a circumference of the annular projecting portion, the outer circumferential side is provided on opposite side of the flexible film from the equilibrium chamber, and
   output associated with actuated displacement of the output portion acts on the flexible film causes the flexible film to undergo displacement with respect to an opening of the second orifice passage, thereby switching the second orifice passage between a communicating state and an obstructed state.

11. The pneumatic actuator according to claim 1, wherein recessed portions are formed between neighboring rib portions of the plurality of rib portions in the circumferential direction of the annular projecting portion, and the recessed portions are defined as sloping faces which slope gradually downward towards the outer circumferential side.

* * * * *